Patented Nov. 29, 1938

2,138,519

UNITED STATES PATENT OFFICE 2,138,519

CYANIDE MANUFACTURE

Walton Barr Tanner, Niagara Falls, N. Y., assignor to E. I. du Pont de Nemours & Company, Wilmington, Del., a corporation of Delaware No Drawing. Application April 17, 1936, Serial No. 75,018

8 Claims. (Cl. 23—79)

This invention relates to the production of alkali metal cyanides and more particularly to the production of such cyanides by reacting hydrocyanic acid or other cyanide forming gas or vapor or compound with a solid alkali metal carbonate.

Heretofore various methods have been proposed for reacting hydrocyanic acid and other cyanide forming compounds, such as formamide, by contacting vapors of such cyanide forming compounds with alkali metal carbonates at temperatures of 200–500° C. This method appears to have the advantage of simplicity, together with comparatively low temperature operation for the manufacture of alkali metal cyanides. However, heretofore it has been difficult to obtain high test cyanide by this method because of various factors which have prevented complete conversion of the carbonate to cyanide. One of the difficulties encountered in this method is that as the reaction between carbonate and HCN proceeds, a mixture of carbonate and cyanide having a relatively low melting point is formed and the reaction mass tends to melt or sinter, which occurrence tends to prevent further reaction of the mass with the hydrocyanic acid vapor. It has been found that such sintering or melting may be at least in part avoided by operating at relatively low temperatures, although at such low temperatures the rate of reaction is comparatively slow, which is a distinct disadvantage. For example, U. S. Patent 1,672,449 describes a method for overcoming the sintering effect, wherein the reaction temperature is maintained at about 350° C. or lower until the cyanide content of the reaction mixture has reached a point above that of the low melting eutectic and thereafter increasing the temperature to a point where the reaction rate becomes rapid, e. g. 450° C. In carrying out this method, because of the low rate of reaction at the lower temperatures, it is necessary to thoroughly and somewhat rapidly agitate the carbonate in order to obtain a reasonable rate of conversion. Furthermore this method requires careful temperature control since, in order to obtain the best possible reaction rate without sintering, the operator must carry out the reaction at the highest possible temperature that can be employed without causing sintering until more than half of the carbonate has been converted to cyanide. Also it is necessary to analyze the reaction mixture at intervals to determine when it is safe to raise the temperature to the point where more rapid reaction takes place.

An object of the present invention is to provide an improved method for the production of alkali metal cyanide by reacting vapor of a cyanide forming compound with a finely divided alkali metal carbonate. A further object is to provide such a method whereby a high degree of conversion of the carbonate to cyanide is obtained. Other objects will be apparent from the following description.

The above objects may be attained in accordance with the present invention by slowly moving a mass of finely divided alkali metal carbonate in such a manner that the carbonate mass is continuously or intermittently turned over so as to continuously present fresh surfaces, while contacting the upper surface of said mass with the vapor of hydrocyanic acid or other cyanide forming compound such as formamide and maintaining the temperature of the mass at about 425 to 500° C. In carrying out this procedure, it is essential that application of any force to the carbonate which would tend to compress it should be avoided. For example an agitation obtained either by the use of rapidly moving stirring members, or by agitation or vibration of the reaction container should be avoided, as such motions tend to compress particles of the carbonate, one against the other, which action has been found to be deleterious as more fully explained below.

In a preferred form of practicing the present invention, carbonate is slowly moved through a reaction space by a means which causes the mass to be slowly turned over or mildly agitated, the linear motion of the mass being counter-current to a stream of hydrocyanic acid vapor or gas mixture containing the same.

I have discovered that if the reaction temperature is maintained at not less than about 425° C. and not more than about 500° C., and care is taken to avoid rapid agitation or compression of the solid reaction mass, substantially complete conversion of the carbonate to cyanide can be obtained and at the end of the reaction the product has the appearance of not having been sintered or fused in any way. If the material is handled during the reaction with HCN so that it becomes compressed, such compressed portions will tend to sinter and hence hinder further reaction. This tendency to sinter, which is very pronounced at temperatures below about 425° C., I have found to be greatly minimized by employing reaction temperatures of about 425 to 500° C. On the other hand, if the reaction is carried out at temperatures below about 425° C., e. g. 250 to 350° C., considerable sintering and sticking together of the material often will occur even though the material is passed slowly through the reactor in the manner utilized in the present invention, as described above; however, the tendency to sinter at such lower temperatures is much less when minimum agitation is employed, as compared with rapid agitation which invariably tends to cause excessive sintering. It is preferable therefore that both the herein described method of moving the carbonate and mildly agitating the same and the temperature range of 425–500° C. be employed in order to obtain substantially complete conversion of carbonate to cyanide in the most efficient manner in accordance with the present invention.

A preferred method of practicing the present invention, which is given by way of example, comprises slowly moving a mass of finely divided metal carbonate through a pipe or trough by means of a screw conveyor, counter-current to a stream of hydrocyanic acid-containing gas at a temperature of 425 to 500° C., preferably around 475° C. In using a screw conveyor for this purpose, care should be taken that the layer of carbonate in the conveyor is relatively shallow, so as to prevent substantial compression of the carbonate by the action of the screw. The maximum allowable depth of the carbonate layer will depend to some extent upon the design of the conveyor screw and the speed of revolution thereof. In general the depth of the carbonate layer should not be more than the radius of the screw and preferably it should be not more than about one-third of the screw's radius. It is also preferable to use a ribbon type screw conveyor rather than the solid type. The speed of rotation of the screw must be sufficiently slow to avoid violent agitation of the carbonate; speeds of from about one-tenth to about four revolutions per minute are suitable, although if the temperature range is carefully restricted, e. g. to the neighborhood of 475° C., somewhat higher speeds may be employed with good results. Other necessary conditions may be observed so as to prevent compression of the carbonate in the passage through the screw conveyor. For example, it is preferable to arrange the screw conveyor in a horizontal position or, if it is desired to slant the conveyor from the horizontal, such slant preferably should not be more than about 10° from the horizontal if the carbonate is caused to travel upwardly, and not more than 45° from the horizontal if the carbonate is caused to travel downwardly.

In practicing the present invention in its preferred form, careful temperature control is important and the various known means for controlling temperatures may be employed. It is preferable to maintain the desired reaction temperature, e. g. 475° C., within a range of not more than 5 to 10° C.

The present invention is not restricted to the employment of a screw conveyor for moving the carbonate within the reaction space since other equivalent means may be utilized. For example, the carbonate may be moved along the bottom of the trough by means of a series of blade like members which are slowly moving through the trough so as to push the carbonate therethrough. Such blade like members may be attached to a moving endless belt which lies parallel to the bottom of the trough. Also, although it is preferable continuously to move the carbonate in the manner above described through an elongated reaction chamber counter-current to a stream of hydrocyanic acid containing gas, it is not essential that the counter-current principle be utilized. For example, the carbonate may be spread in a relatively thin layer on the bottom of a shallow, vertical, cylindrical vessel, which is closed at the top and through which the hydrocyanic acid containing gas is passed and the above described motion of the carbonate within the reaction vessel may be obtained by moving arms or blades, e. g. radiating from a central shaft, which come in contact with the floor of the vessel and thus slowly push the carbonate around therein.

The present invention is further illustrated by the following examples:

*Example 1*

A screw conveyor 6 inches in diameter by 9 feet long, arranged horizontally, was provided with an inlet for carbonate and HCN at one end and a gas outlet and an outlet for solid material at the other end. The barrel of the screw conveyor was surrounded by a cylindrical pipe 8 inches in diameter and the annular space between was filled with molten tin which served as a temperature control bath. By applying heat to the exterior through the 8 inch pipe the temperature was controlled as desired. The screw of the conveyor was a standard 6 inch ribbon screw having a ribbon ¾ inch wide by $\tfrac{1}{16}$ inch thick. Solid finely divided anhydrous sodium carbonate was fed in at one end of the screw conveyor while the screw was rotated in such a manner as to move the carbonate toward the other end. Simultaneously hydrocyanic acid vapor was passed through the screw conveyor counter-current to the carbonate flow. A number of definite portions of carbonate were reacted with HCN in this manner, utilizing the different reacting temperatures and different speeds of the screw conveyor. The results obtained are given in the following table:

| Run | Temperature | Screw, R. P. M. | Cyanide in product |
|---|---|---|---|
| | °C. | | Percent |
| 1 | 475 | 1 | 86 |
| 2 | 475 | ½ | 94 |
| 3 | 425 | ½ | 84 |
| 4 | 425 | 4 | 80 |
| 5 | 425 | 8 | 67 |

In run No. 5, after 4 hours' operation, the screw conveyor became plugged, due to sintering of the reaction mass. There was no evidence of sintering or plugging in runs 1, 2, 3 and 4.

*Example 2*

Another series of runs was made in the manner described by Example 1, except that the screw conveyor was 4 inches in diameter and a lower range of reaction temperature was employed. The data thus secured are tabulated below:

| Run | Temperature | Screw, R. P. M. | Cyanide in product | Remarks |
|---|---|---|---|---|
| | °C. | | Percent | |
| 1 | 300–320 | 1 | 12–55 | After about 4 hours of operation, the conveyor was plugged with sintered material. The product was colored with HCN polymer. |
| 2 | 350–375 | 1 | 18 | Conveyor plugged after about 3 hours operation by sintered material. |
| 3 | 360–390 | 1 | 60 | Conveyor plugged by sintered material after 2 hours operation. |

In each of the above three runs the solid material undergoing reaction sintered, forming a pasty mass in the screw conveyor. As this pasty material neared the discharge end it tended to solidify, gradually building a hard, dense mass in the apparatus, which finally prevented rotation of the screw.

As shown by comparison of Examples 1 and 2, above, it is essential to maintain the temperature above about 425°, in order to prevent undue sintering. The reason for this probably is that at the higher temperatures, the reaction rate becomes so much faster that individual particles of the material are quickly converted from carbonate to cyanide of 80% purity or better. Thus such particles exist in the form of the low melting cyanide-carbonate eutectic only for a very short period of time and the result is that the mass as a whole does not appreciably sinter. Apparently there is only a slight tendency towards sintering and as long as the movement or stirring of the mass is carried out in such manner as to avoid pressing the particles together, no appreciable sintering of the mass will occur. The above is one explanation of the novel results obtained and the present invention is not understood as being restricted thereby.

Example 1 illustrates the necessity for stirring the mass by a particular mild agitation which avoids compression of the material, while slowly but constantly exposing fresh surfaces. The 6 inch diameter ribbon type screw conveyor of that example, when operated at ⅙ to 4 R. P. M. produced the type of mild agitation required for my invention but when operated at 8 R. P. M. the agitation was too violent. At rotational speeds of ⅙, 1 and 4 R. P. M., respectively, the peripheral velocities of the ribbon through the material were 3.1, 18.8 and 74.4 inches per minute, respectively. Hence the mild agitation of my invention may be accomplished by moving a stirring device through the reaction mass at a speed of about 3 to 75 inches per minute.

I claim:

1. A process for converting finely divided, solid alkali metal carbonate to the corresponding cyanide comprising agitating said carbonate by means of a stirring device moving through the mass at a speed of about 3 to 75 inches per minute while contacting said carbonate with the vapor of a cyanide-forming compound at a temperature of 425–500° C., and maintaining said temperature throughout the entire reaction.

2. A process for converting finely divided, solid alkali metal carbonate to the corresponding cyanide comprising passing said carbonate through a reaction space while stirring it by means of a stirring device moving through the mass at a speed of about 3 to 75 inches per minute while contacting said carbonate with the vapor of hydrocyanic acid at a temperature of 425 to 500° C., and maintaining said temperature throughout the entire reaction.

3. A process for converting finely divided, solid alkali metal carbonate to the corresponding cyanide comprising passing said carbonate through a reaction space while stirring it by means of a stirring device moving through the mass at a speed of about 3 to 75 inches per minute and while contacting said carbonate with the vapor of formamide at a temperature of 425–500° C., and maintaining said temperature throughout the entire reaction.

4. A process for converting finely divided, solid sodium carbonate to the corresponding cyanide comprising passing said carbonate through a reaction space while stirring it by means of a stirring device moving through the mass at a speed of about 3 to 75 inches per minute and while contacting said carbonate with the vapor of a cyanide-forming compound at a temperature of 425–500° C., and maintaining said temperature throughout the entire reaction.

5. A process for converting finely divided, solid sodium carbonate to the corresponding cyanide comprising passing said carbonate through a reaction space while stirring it by means of a stirring device moving through the mass at a speed of about 3 to 75 inches per minute and while contacting said carbonate with the vapor of hydrocyanic acid at a temperature of 425–500° C., and maintaining said temperature throughout the entire reaction.

6. A process for converting finely divided, solid sodium carbonate to the corresponding cyanide comprising passing said carbonate through a reaction space by the action of a screw conveyor having a peripheral velocity of about 3 to 75 inches per minute substantially without compression of the mass while contacting said carbonate with the vapor of hydrocyanic acid at a temperature of 425 to 500° C., and maintaining said temperature throughout the entire reaction.

7. A process for converting finely divided, solid sodium carbonate to the corresponding cyanide comprising passing said carbonate through a reaction space while stirring it by means of a stirring device moving through the mass at a speed of about 3 to 75 inches per minute while contacting said carbonate with the vapor of formamide at a temperature of 425 to 500° C., and maintaining said temperature throughout the entire reaction.

8. A process for converting finely divided, solid sodium carbonate to the corresponding cyanide comprising passing said carbonate through a reaction space by the action of a screw conveyor having a peripheral velocity of about 3 to 75 inches per minute substantially without compression of the mass while contacting said carbonate with the vapor of hydrocyanic acid at a temperature of about 475° C., and maintaining said temperature throughout the entire reaction.

WALTER BARR TANNER.